US006823479B1

United States Patent
McElhaney, Jr. et al.

(10) Patent No.: US 6,823,479 B1
(45) Date of Patent: Nov. 23, 2004

(54) NETWORK FAULT ANALYSIS TOOL

(75) Inventors: Robert E. McElhaney, Jr., Berwick, ME (US); David Kaffine, Billerica, MA (US); Anthony C. Hughes, Belmont, MA (US); William Minckler, Waltham, MA (US); Neelesh Agrawal, Burlington, MA (US); Peter H. Schmidt, Lexington, MA (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/503,352

(22) Filed: Feb. 14, 2000

(51) Int. Cl.$^7$ .................................................. G06F 11/00
(52) U.S. Cl. .................................................. 714/43; 714/4
(58) Field of Search ............................ 714/43, 4, 712; 709/224

(56) References Cited

U.S. PATENT DOCUMENTS

| | | | |
|---|---|---|---|
| 5,347,524 A | * 9/1994 | I'Anson et al. ............. | 709/224 |
| 5,377,196 A | 12/1994 | Godlew et al. ............. | 371/20.1 |
| 5,864,662 A | * 1/1999 | Brownmiller et al. ....... | 714/43 |
| 5,870,540 A | * 2/1999 | Wang et al. ................ | 714/43 |
| 5,931,961 A | * 8/1999 | Ranganathan et al. ...... | 340/514 |
| 6,049,828 A | * 4/2000 | Dev et al. ................... | 709/220 |
| 6,269,330 B1 | * 7/2001 | Cidon et al. ................ | 370/248 |
| 6,336,138 B1 | * 1/2002 | Caswell et al. ............. | 345/440 |
| 6,360,332 B1 | * 3/2002 | Weinberg et al. ........... | 714/38 |
| 6,397,359 B1 | * 5/2002 | Chandra et al. ............ | 709/224 |

FOREIGN PATENT DOCUMENTS

WO    WO 99/34544    7/1999    ............. H04J/3/14

OTHER PUBLICATIONS

Horneffer M: "Methods for Performance–Analysis of Internet Access Points" Computer Networks and ISDN Systems, North Holland Publishing. Amsterdam, NL, vol. 30, No. 16–18, Sep. 30, 1998 (Sep. 30, 1998), pp. 1607–1615, XP004138692 ISSN: 0169-7552.

De Albuquerque C V N; Nunes M D; Duarte O C M B:"An Efficient Implementation Architecture for Layered Communication Systems" 38$^{th}$ Midwest Symposium on Circuits and Systems, Aug. 13–16, 1995, pp. 514–517, XP002181823 Rio de Janeiro, Brazil, the whole document.

* cited by examiner

Primary Examiner—Robert Beausoliel
Assistant Examiner—Christopher McCarthy
(74) Attorney, Agent, or Firm—Teradyne Legal Department

(57) ABSTRACT

A testing tool for Internet Service Provider (ISP) network engineers which is used to diagnose network faults, characterize network performance and evaluate new equipment and software releases. The tool can be used to schedule and run proactive tests to identify network problems before subscribers are affected. Further, the tool can be used to provide testing on demand to quickly isolate the root cause of a problem identified by the tool or by network management systems or subscribers. The tool is topology independent and thus does not have to be reconfigured as the network changes. The tool only sends traffic as directed by the network engineer and thus does not generate undesirable heavy network traffic loads, unless such a heavy network loads are desired by the network engineer.

24 Claims, 4 Drawing Sheets

NETWORK FAULT ANALYSIS TOOL

BACKGROUND OF THE INVENTION

Network tools are used to monitor and diagnose network faults. These tools typically monitor network traffic and make determinations regarding transfer times and packet loss. Most of these tools provide testing across Open System Interconnection (OSI) layer 1 and 2 (Physical Layer and Data Link Layer) only. Further, many of these known tools are topology dependent, in that they must know the layout of the network in order to monitor and test the network. As the network changes, the tool information must be updated to keep up with the current network topology. Another problem associated with existing network tools is that they may generate heavy network loads in order to conduct tests and make measurements, which affect the network users. It would be desirable to have a network tool which provides testing capabilities across multiple OSI layers, which is topology independent, and which only generates a minimal amount of network traffic necessary to obtain the desired results.

SUMMARY OF THE INVENTION

With the foregoing background in mind, it is an object of the present invention to provide a testing tool for Internet Service Provider (ISP) network engineers which is used to diagnose network faults, characterize network performance and evaluate new equipment and software releases. The tool can be used to schedule and run proactive tests to identify network problems before subscribers are affected. Further, the tool can be used to provide testing on demand to quickly isolate the root cause of a problem identified by the tool or by network management systems or subscribers. The tool is topology independent and thus does not have to be reconfigured as the network changes. The tool only sends traffic as directed by the network engineer and thus does not generate undesirable heavy network traffic loads, unless such a heavy network loads are desired by the network engineer.

BRIEF DESCRIPTION OF THE DRAWINGS

The invention will be better understood by reference to the following more detailed description and accompanying drawings in which.

DESCRIPTION OF THE PREFERRED EMBODIMENT

A tool for Internet Service Provider (ISP) engineers is presented. The tool provides network engineers with the ability to quickly write and deploy tests to diagnose network faults and to characterize network performance. Additionally, the tool is useful for evaluating new equipment and software releases.

The tool provides active testing capabilities across Open Systems Interconnection (OSI) layers two through seven (the data link layer, network layer, transport layer, session layer, presentation layer and application layer respectively). With the present invention, an ISP network engineer can test both basic connectivity and performance as well as common Internet applications and services such as HyperText Transfer Protocol (HTTP), File Transfer Protocol (FTP), Domain Naming System (DNS), Simple Mail Transfer Protocol (SMTP), and Post Office Protocol (POP). The network engineer can test the ISP network and can also test other locations accessible by the ISP's users, such as popular web sites.

The present invention can be used in two modes. In a first mode the tool is used to perform scheduled proactive testing and routining. In this manner network problems can be identified before subscribers are affected. In a second mode the tool is used to provide testing on demand in order to quickly isolate root causes of symptoms identified by the tool, reported by Internet subscribers or identified by network management systems.

Figure 1:
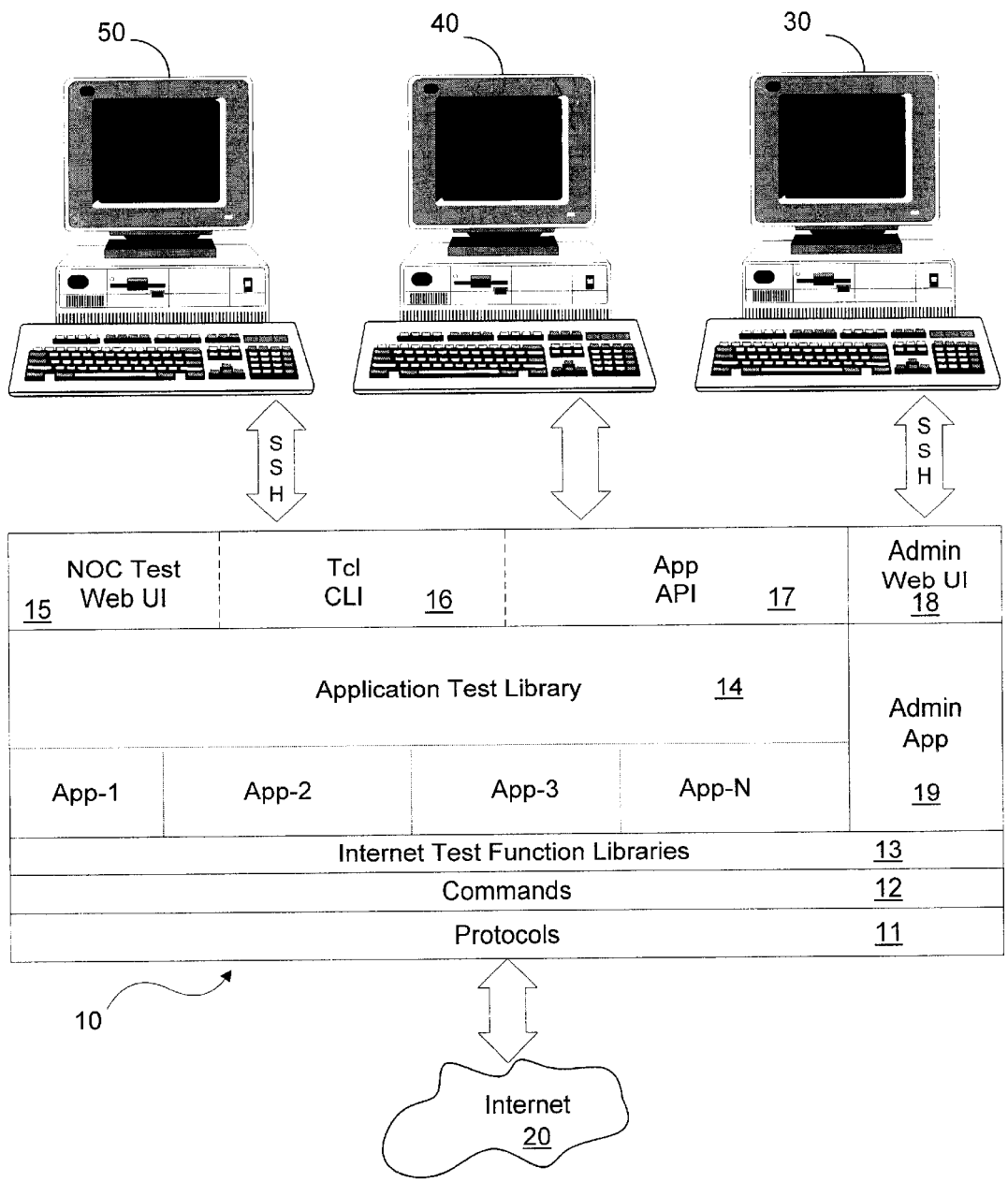
FIG. 1 is a block level diagram of the network fault analysis tool of the present invention.

Referring now to FIG. 1, the tool 10 comprises a hardware/software system specifically developed for Internet testing and fault isolation. The tool includes protocols 11, commands 12 and Internet test function libraries 13. The tool also includes test applications 14, user interfaces 15 and 18, and an Application Program Interface (API) 17.

Protocols 11 comprise custom developed, testing focused protocol stacks. Bit level and individual state transition-level control over the operation of all the protocols enable the users to quickly create tests that cannot be performed with standard protocol stacks.

Commands 12 allow the tool to perform protocol-level actions such as opening a Transmission Control Protocol (TCP) connection or requesting a HyperText Markup Language (HTML) file from a web server.

Test function libraries 13 provide convenient building blocks for developing test applications. A test function contains commands to execute a specific network test. For example, the "HTTP page access command" test function issues a GET request for a specified Uniform Resource Locator (URL), and then times and records important aspects of the response. In order to create a new test application, a user writes a script using the pre-written test functions. The test function library 13 includes the following functions.

The Internet Control Message Protocol (ICMP) Ping function sends a standard ICMP ping to the specified destination OSI (IP) address. Multiple pings can be sent with the retry option. Timing statistics are kept for each ping sent. By default, the number of responses and min/max/average round trip times are presented. Several standard error conditions are also reported.

The TCP Ping function attempts to open a TCP connection to the specified TCP port on the machine with the specified destination address. Multiple pings can be sent with the retry option. If a response is seen to a TCP ping, the IDU then closes the TCP connection. Timing statistics are kept for each ping sent. By default, the number of normal responses and min/max/average round trip times are presented. Several standard error conditions are also reported.

The HTTP Ping function extends the TCP ping function. For each ping, if a TCP connection is established an HTTP HEAD command is sent, and HEAD data is expected in response. The path for the head request defaults to "/", but can be optionally specified, and the port defaults to the standard HTTP port, but can be overridden. The function opens a TCP connection to the specified server and issues a HEAD request (with configurable HTTP version) for the root of the document tree. The function also records and times the response. In addition to standard timing and success statistics, details about headers in the data returned is available.

The HTTP page access function is similar to the HTTP ping function, but gets the entire page at the specified URL, and does not have a retry option. The function opens a TCP connection to a specified server and issues a GET request for the specified URL. The function times and records important aspects of the response.

The UDP Traceroute function performs a standard traceroute to a specified host. The maximum time-to-live for the packets (which limits the number of hops the traceroute can cover) defaults to 255, but can be optionally set to any legal value. The destination UDP port may be specified or it can default to a randomly selected port number in a suitable range. The size of the UDP packets sent can be controlled. For each hop detected in the route to the destination, timing and success information is available, as is error information for several standard errors that can occur.

The TCP Traceroute function is similar to the UDP traceroute function except that instead of sending UDP packets, TCP SYN packets are sent to the specified port. When the traceroute has progressed to the point that a packet reaches the final destination, this will attempt to open a TCP connection. If successful, the connection is then closed.

SMTP Mail related functions include SMTP ping, SMTP test mail, SMTP-DNS, SMTP performance and SMTP Rx Mail. The SMTP ping function makes a TCP connection to a specified server, times the response and observes an expected banner message. The SMTP test mail function connects to a specified server and verifies that a mail message to a specified username is accepted, and times individual pieces of the transaction. The SMTP-DNS function, for a given email address, performs a DNS MX query (from root servers or from specified nameserver) to determine destination SMTP server, then performs "SMTP Test Mail". The SMTP performance function connects to a specified server and begins transferring a bulk test message (optionally delivered/aborted), measuring server's response time, and any observed message limit. The SMTP Rx Mail function starts an SMTP server listening for a client connection. After the client connects, the function expects, times and records details of an email message transfer.

POP3 Mail related functions include POP Ping, POP Rx Mail, POP Mail Purge, POP Mail View, POP Serve and POP Performance. The POP Ping function makes a TCP connection to a specified server, times the response and observes/records expected POP3 banner. The POP Rx Mail function connects to a specified server, authenticates with a provided username/password, retrieves list of messages and sizes. The POP Mail Purge function connects to a specified server and authenticates. The function then deletes specified message (s) without retrieving. The POP Mail View function connects to a specified server and authenticates. The function also records and times the retrieval of a specified portion of a specified message. The POP Serve function starts a POP3 server listening for a client connection. After the client connects, the function accepts any authorization attempt and any attempt to list or retrieve message(s). The client is told there is a single message, and any attempt to retrieve a message or messages will get the test message text. The POP Performance function connects to a specified server and authenticates. The function selects the largest queued message and retrieves sufficient quantity of data to make performance measurement.

DNS functions include DNS Ping, DNS Lookup, and DNS server. The DNS Ping function sends a simple UDP based DNS request to the specified name server and times and observes a correct response. The DNS Lookup function sends an arbitrary single UDP based DNS request to either the specified server, or performs a recursive lookup itself starting at a root server(for comparison). The function also times the response and records the result. The DNS serve function starts a DNS server listening for a client request. Details of the client request are recorded, and the specified result is returned to the client.

Web based functions include FTP Ping, HTTP Performance, HTTP Serve Test Page, HTTP Proxy Serve, HTTP Auth Looking-in and HTTP Auth Looking-out. The FTP Ping function opens a TCP connection to a specified server, time and records the expected banner. The HTTP Performance function measures timing performance of web responses for several requests, in series and in parallel, for a specified URL. The HTTP Serve Test Page function starts an HTTP server listening as a proxy for a client request. The function records details of the request and returns the specified test page contents. Optionally, the function will re-execute the request to the target server and return the actual content. The HTTP Auth Looking in function performs an HTTP Page Access, expecting an authentication request, and using the specified username/password. The function times and records each step of the process. The HTTP Auth Looking-out function starts an HTTP server listening for a client request. When the client request arrives, the function requests and records authentication before delivering specified test page contents.

While a particular group of functions has been described, other functions may also be included. For example, the following functions could also be part of the Internet test function libraries 13. A Border Gateway Protocol V4 (BGP4) function comprises a network to network routing protocol for autonomous systems. A Dynamic Host Configuration Protocol (DHCP) function is a protocol enabling dynamic addressing and configuration. An Internet Relay Chat (IRC) function establishes a protocol to implement chat functionality. A Network News Transport Protocol (NNTP) function enables news distribution from servers to subscribers. An Open Financial Exchange (OFX) function enables electronic exchange of financial data over secure links (SET, SSL). An Open Shortest Path First (OSPF) function enables routing based on cost metrics.

Additional functions may include the following. A ReSerVation Protocol (RSVP) function enables reservation and prioritization of network paths. A Routing Information Protocol (RIP) function enables routing based on a distance vector. A Remote Authentication Dial-In User Service (RADIUS) function provides authentication of remote dial-in users. A Real Time Streaming Protocol (RTSP) function enables continuous multi-media communications over the Internet. A Network Terminal Access (Telnet) function enables remote terminal access. A Voice over Internet Protocol (VoIP) enables voice communication over the Internet.

The test application library 14 comprises Tcl scripts that use multiple test functions to perform a higher level task such as diagnosing a network fault or characterizing network performance. Test applications can be used in a proactive or reactive mode to identify network problems and diagnose and isolate their root causes. Test application results can be made available to appropriate personnel via email or pager notification, enabling action to be taken as soon as possible Example applications will be described in detail below.

Referring back to FIG. 1, the tool 10 also includes a Network Operations Center (NOC) Test WEB User Interface 15 which allows a network engineer to access the tool from an authorized workstation 50. Access is done via a built-in Web-based user interface over a secure shell (SSH). Using the interface, the network engineer can run the tool applications and execute test functions The tool 10 also includes a Tcl command line interface 16. Network engineers can run the tool applications and test functions from a Tcl command line interface via secure shell (SSH).

The tool 10 also includes one or more custom application programming interfaces (API) 17. The API 17 may be used to interface the present tool with the APIs of existing monitoring and management systems. The API 17 is shown coupled to a workstation 40.

The tool 10 may additionally include an Administration Application 19 and a User Interface 18. Administrative functions such as configuration and maintenance are performed using the administrative interface 18 secured via SSH.

As recited above, three examples of test applications of the test application library 14 are described in detail to show isolation and root cause analysis. The three described examples are a web characterization application, a network performance characterization application, and a multi-size packet pinger application.

Figure 2:
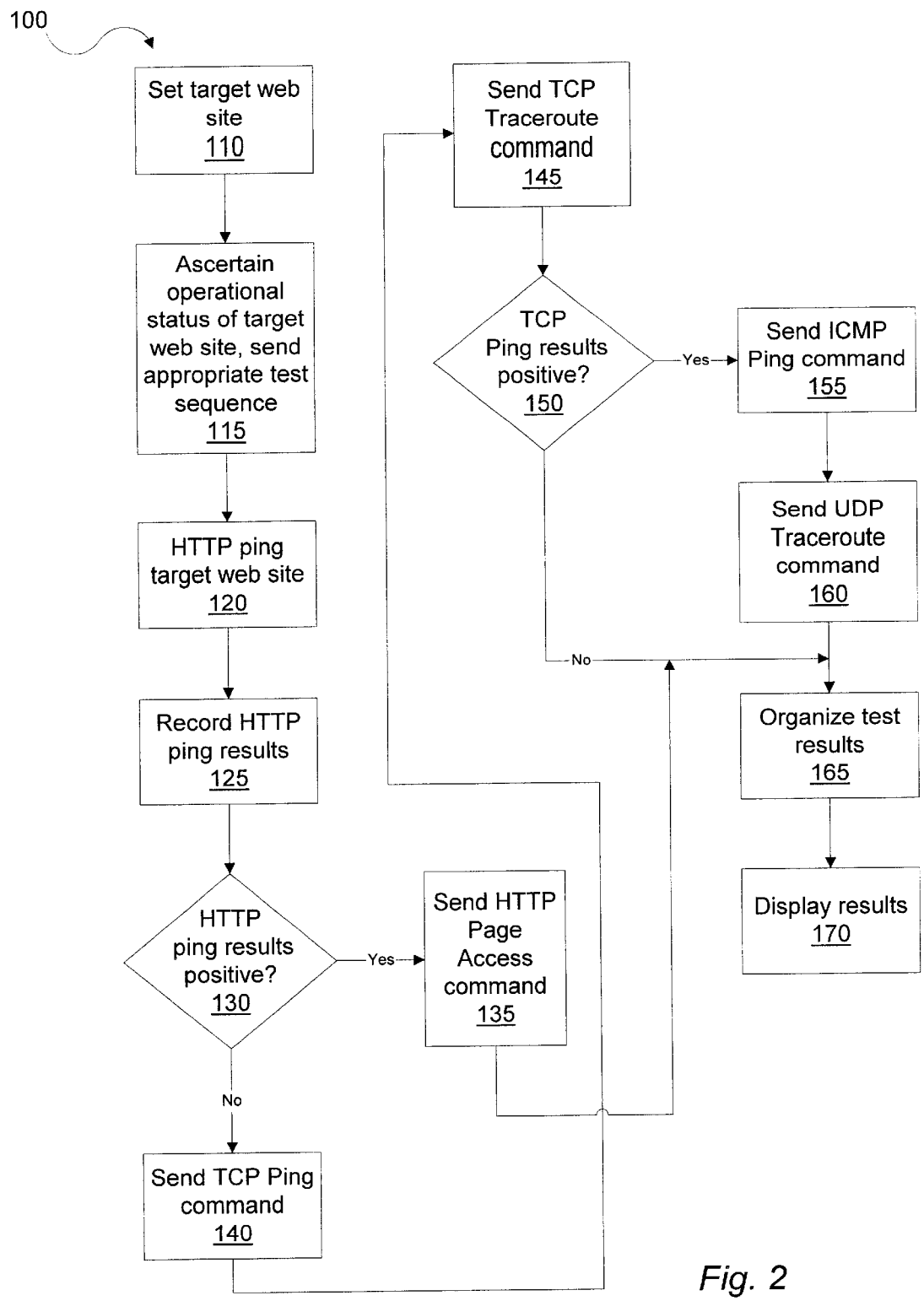
FIG. 2 is a flowchart representing a web characterization application.

Referring to FIG. 2, a flow chart of the web characterization application 100 is shown. This application is executed on demand to assess network performance. This application is used to measure latency and packet loss behavior of the ISP, external networks, and a specified destination such as a web site. The following sequences of tests are executed.

Initially, at step 110, the target web site is set. Next, as shown at step 115, the operational status of the target web site is ascertained and the appropriate test sequence is sent. While there are numerous test sequences, only a particular test sequence will be described in this embodiment. The following step, step 120, an HTTP ping of the target web site is performed. At step 125 the HTTP ping results are recorded.

The next step 130 involves a determination as to whether the HTTP ping results were positive. If the HTTP ping results are positive then a send HTTP page access command is issued as shown in step 135. The execution timing of the command and the data received are recorded as part of this step.

Upon obtaining negative results from step 130, step 140 is executed. Step 140 sends a TCP ping command. The execution timing and data received are recorded. Next, at step 145 a TCP Traceroute command is executed. The timing of this command and the data received are recorded.

The next step 150 involves a determination of whether the TCP Ping results are positive. If the results are positive, then step 155 is executed. Step 155 sends an ICMP Ping command. Following step 155, a Send UDP traceroute command is executed, as shown in step 160.

The next step to be executed is step 165. Step 165 is executed following step 160, by obtaining positive results from step 150, or upon completion of step 135. Step 165 organizes the test results, and step 170 displays the results.

Figure 3:
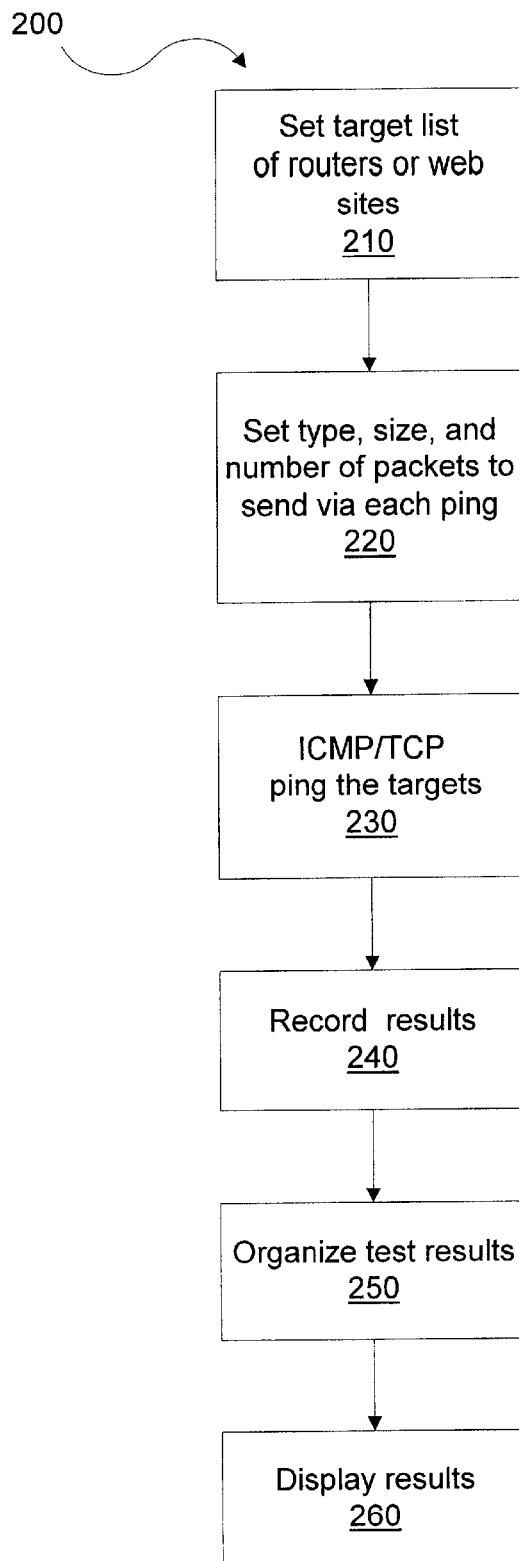
FIG. 3 is a flow chart representing a network performance characterization application.

Referring now to FIG. 3 a flowchart for a Network Performance Characterization application 200 is shown. This application 200 characterizes network performance by measuring latency and packet loss behavior of the ISP and the external networks to a specific destination server or router. The application accepts a list of systems to probe with a configurable ICMP or TCP pinger. The network performance characterization application 200 operates as follows.

A first step 210 sets a target list of routers or web sites to be characterized. The next step, step 220, sets the type, size and number of packets to send via each ping. At step 230 an ICMP/TCP ping of the targets is performed. The results of the pings are recorded in step 240. At step 250 the results are organized. The final step 260 involves displaying the network performance characterization results at the user web page.

Figure 4:
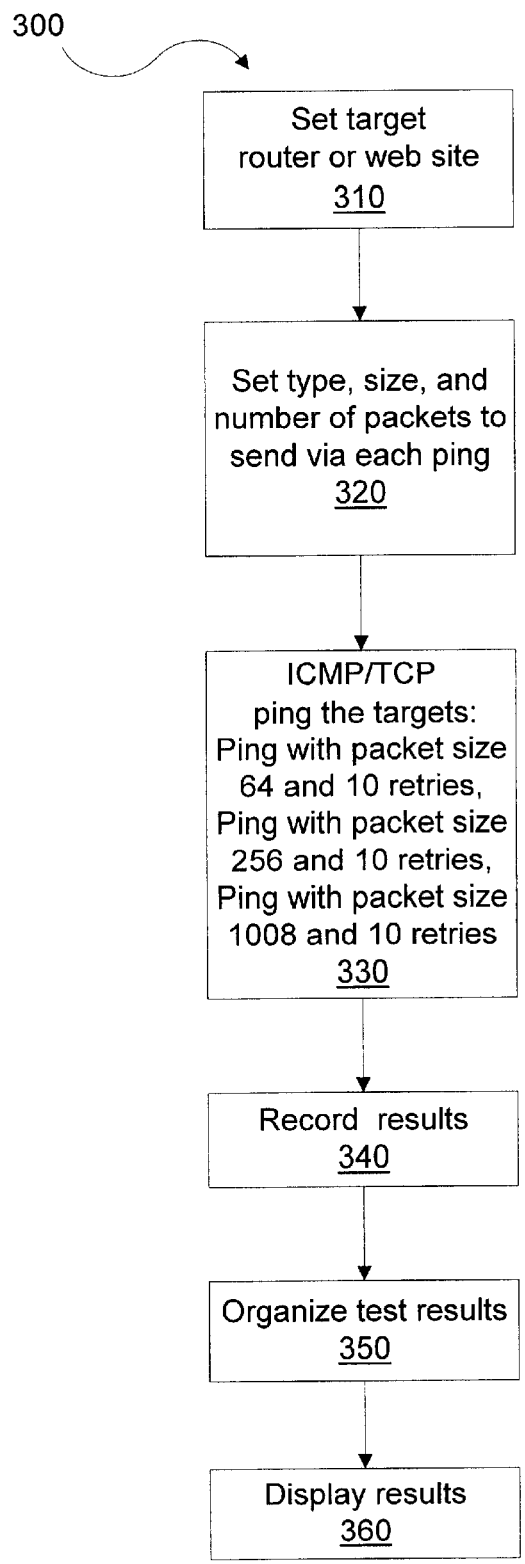
FIG. 4 is a flow chart representing a multi-size packet pinger.

Referring now to FIG. 4, a flow chart for a multi-size packet pinger 300 is shown. The multi-size packet pinger application 300 permits network engineers to send three simultaneous ICMP or TCP pings with each packet size set different from the others. For example, three ranges—small (1–192 bytes), medium (193–576 bytes) and large (577–1500 bytes). The purpose of this application 300 is to help identify routers in which packet loss increases due to the inbound packet size. The multiple-size packet pinger 300 operates as follows.

A first step 310 sets a target router or web site to be characterized. The next step, step 320, sets the type, size and number of packets to send via each ping. At step 330 ICMP/TCP pings of the target are performed. Pings having a packet size of 64, 256 and 1008 performed. The results of the pings are recorded in step 340. At step 350 the results are organized. The final step 360 involves displaying the results at the user web page.

By way of the above-described invention an ISP network engineer can diagnose network faults, characterize network performance and evaluate new equipment and software releases. The tool can be used to schedule and run proactive tests to identify network problems before subscribers are affected. Further, the tool can be used to provide testing on demand to quickly isolate the root cause of a problem identified by the tool or by network management systems or subscribers. The tool is topology independent and thus does not have to be reconfigured as the network changes. The tool only sends traffic as directed by the network engineer and thus does not generate heavy network traffic loads.

Having described preferred embodiments of the invention it will now become apparent to those of ordinary skill in the art that other embodiments incorporating these concepts may be used. Additionally, the software included as part of the tool may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A tool comprising:
   a processor capable of being coupled to a data network;
   processor-readable storage for storing instructions and data for causing the processor to perform testing on said data network;
   wherein said instructions and data include at least one protocol stack; and wherein said protocol stack allows bit-level and individual state transition level control over protocols.

2. The tool of claim 1 wherein said instructions and data include commands for scheduling proactive testing to identify problems before subscribers of said data network are affected.

3. The tool of claim 1 wherein said instructions and data include commands for performing testing on demand of said data network to isolate root causes of symptoms identified by at least one of said tool, said subscribers, and a network management system.

4. The tool of claim 1 wherein said data and instructions further includes a test application library having a multisize packet pinger.

5. The tool of claim 4 wherein said test application library comprises scripts using multiple test functions.

6. The tool of claim 1 wherein testing protocols are selected from the group consisting of IP, TCP, UDP, HTTP, ICMP, SMTP, DNS, POP, FTP, RADIUS, HTTPS and PPP.

7. The tool of claim 1 wherein testing comprises ping testing across at least two of the OSI layers two through seven.

8. The tool of claim 1 wherein said processor performs testing of an ISP network.

9. The tool of claim 1 wherein said processor performs testing of web sites accessible by users of said data network.

10. The tool of claim 1 wherein said applications are integrated with an Application Programming Interface (API) of an existing monitoring and management system.

11. A tool comprising:

a processor capable of being coupled to a data network;

processor-readable storage for storing instructions and data for causing the processor to perform at least one of testing said data network, diagnosing a network fault and characterizing network performance of said data network; and wherein said instructions and data include at least one of protocol stacks, commands for performing protocol-level actions, a test function library, a test application library, a user interface, a command line interface, a custom API, and an administration user interface, wherein said tool is non topology-dependent of said data network.

12. A computer program product for a Fault Analysis Tool, the computer program product comprising a computer usable medium having computer readable code thereon, including program code comprising:

instructions and data for causing a processor to perform at least one of testing a data network, diagnosing a network fault, and characterizing network performance of a data network;

wherein said computer program product is topology independent of said data network.

13. The computer program product of claim 12 wherein said instructions and data include at least one of protocol stacks, commands for performing protocol-level actions, a test function library, a test application library, a user interface, a command line interface, a custom API, and an administration user interface.

14. The computer program product of claim 13 wherein said protocol stacks allow bit-level and individual state transition level control over protocols.

15. The computer program product of claim 14 wherein testing comprises attempts to connect to a network node at at least two of the OSI layers two through seven.

16. The computer program product of claim 15 wherein said test application library includes a multi-size packet pinger application.

17. The computer program product of claim 13 wherein said test application library includes a multi-size packet pinger application.

18. The computer program product of claim 13 wherein testing protocols are selected from the group consisting of IP, TCP, UDP, HTTP, ICMP, SMTP, DNS, POP, FTP, RADIUS, HTTPS, PPP.

19. The computer program product of claim 13 wherein said test application library comprises scripts using multiple test functions.

20. The computer program product of claim 13 wherein said applications are integrated with an Application Programming Interface (API) of an existing monitoring and management system.

21. The computer program product of claim 12 wherein said instructions and data include commands for scheduling proactive testing to identify problems before subscribers of a data network are affected.

22. The computer program product of claim 12 wherein said instructions and data include commands for performing testing on demand of a data network.

23. The computer program product of claim 12 wherein said data network comprises an ISP network.

24. The computer program product of claim 12 wherein said data network includes web sites accessible by users of said data network.

* * * * *